United States Patent
Pereira Da Silva et al.

(10) Patent No.: US 12,032,385 B2
(45) Date of Patent: Jul. 9, 2024

(54) METHOD AND SYSTEM FOR COLLABORATIVELY DETECTING TANGIBLE BODIES IN AN ENVIRONMENT

(71) Applicant: COMMISSARIAT A L'ENERGIE ATOMIQUE ET AUX ENERGIES ALTERNATIVES, Paris (FR)

(72) Inventors: Alex Pereira Da Silva, Grenoble (FR); Sylvain Leirens, Grenoble (FR); Suzanne Lesecq, Grenoble (FR); Diego Puschini Pascual, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 334 days.

(21) Appl. No.: 17/473,859

(22) Filed: Sep. 13, 2021

(65) Prior Publication Data

US 2022/0083077 A1 Mar. 17, 2022

(30) Foreign Application Priority Data

Sep. 14, 2020 (FR) ........................................ 2009291

(51) Int. Cl.
*G06F 18/25* (2023.01)
*G05D 1/00* (2006.01)
(Continued)

(52) U.S. Cl.
CPC .......... *G05D 1/0274* (2013.01); *G06F 18/253* (2023.01); *G06V 20/58* (2022.01); *G06N 7/01* (2023.01)

(58) Field of Classification Search
CPC ...... G05D 1/0274; G06V 20/58; G06V 10/80; G06N 7/01; G06F 18/25; G06F 18/253; G06F 17/18
See application file for complete search history.

(56) References Cited

U.S. PATENT DOCUMENTS

2012/0053755 A1* 3/2012 Takagi ................. G01S 7/4808
 701/1
2017/0352163 A1 12/2017 Mottin et al.
(Continued)

FOREIGN PATENT DOCUMENTS

EP 3121762 A1 1/2017
EP 3252615 A1 12/2017
(Continued)

OTHER PUBLICATIONS

Dia, Roxana, Suzanne Lesecq, Julien Mottin, and Diego Puschini. "General inverse sensor model for probabilistic occupancy grid maps using multi-target sensors." In 23rd International Symposium on Mathematical Theory of Networks and Systems, p. 8. 2018. (Year: 2018).*

(Continued)

*Primary Examiner* — Carol Wang
(74) *Attorney, Agent, or Firm* — BakerHostetler (57) ABSTRACT

A method is provided for collaboratively detecting tangible bodies in an environment employing a plurality of distance sensors with which respective carriers are equipped, including: for each sensor, acquiring a series of measurements of distance of a closest tangible body along a line of sight; applying an inverse model of the sensor on a local occupancy grid; and constructing a consolidated local occupancy grid via Bayesian fusion of the occupancy probabilities thus determined; and, computing occupancy probabilities of the cells of a global occupancy grid via Bayesian fusion of the occupancy probabilities of corresponding cells of at least certain of said consolidated local occupancy grids. A system for implementing such a method is also provided.

14 Claims, 10 Drawing Sheets

(51) Int. Cl.
   *G06V 20/58* (2022.01)
   *G06N 7/01* (2023.01)

(56) References Cited

U.S. PATENT DOCUMENTS

2018/0231650 A1* 8/2018 Heitzmann ............. G01S 13/86
2018/0247216 A1* 8/2018 Mottin .................... G06F 17/18

FOREIGN PATENT DOCUMENTS

| EP | 3 364 213 A1 | 8/2018 |
| FR | 3041451 A1 | 3/2017 |
| WO | 2017050890 A1 | 3/2017 |

OTHER PUBLICATIONS

Rakotovao, Tiana, Julien Mottin, Diego Puschini, and Christian Laugier. "Real-time power-efficient integration of multi-sensor occupancy grid on many-core." In 2015 IEEE International Workshop on Advanced Robotics and its Social Impacts (ARSO), pp. 1-6. IEEE, 2015. (Year: 2015).*
Zhangjing Wang, et al., "Multi-Sensor Fusion in Automated Driving: A Survey", IEEE Access, IEEE, pp. 2847-2868, vol. 8, No. 26, Dec. 26, 2019, XP011766201.
Tiana Rakotovao, et al., "Multi-Sensor Fusion of Occupancy Grids Based on Integer Arithmetic", IEEE International Conference on Robotics and Automation, May 16, 2016, pp. 1854-1859, XP032908400.
Andrade Valente Da Silva Michelle, "SLAM and Data Fusion for Autonomous Vehicles : from Classical Approaches to Deep Learning Methods", PhD Thesis, Dec. 18, 2019, pp. 1-172, XP055807979. URL:https://pastel.archives-ouvertes.fr/tel-03167034/document.
Trung-Dung Vu, "Vehicle Perception: Localization, Mapping with Detection, Classification and Tracking of Moving Objects", PhD-Thesis, Sep. 18, 2019, XP055154102. URL:https://tel.archives-ouvertes.fr/tel-00454238/document.
Carlos Galvez Del Postigo Fernandez et al., "Grid-Based Multi-Sensor Fusion for On-Road Obstacle Detection: Application to Autonomous Driving", Aug. 2015, XP055555247. URL:https://www.diva-portal.org/smash/get/diva2:852457/FULLTEXT01.pdf.
Elfes 1990: A. Elfes, "Occupancy grids: a stochastic spatial representation for active robot perception" (Sixth Conference on Uncertainty in AI, 1990). URL:https://arxiv.org/ftp/arxiv/papers/1304/1304.1098.pdf.
Coué 2006: Coué, C., Pradalier, C., Laugier, C., Fraichard, T. and Bessière, P. "Bayesian Occupancy Filtering for Multitarget Tracking: An Automotive Application". The International Journal of Robotics Research, Jan. 2006 URLhttps://hal.inria.fr/inria-00182004/document.
Pathak 2007: Pathak, K., Birk, A., Poppinga, J., and Schwertfeger, S., "3D forward sensor modeling and application to occupancy grid based sensor fusion". IEEE/RSJ International Conference on Intelligent Robots and Systems, Dec. 2007. URL:http://citeseerx.ist.psu.edu/viewdoc/download?doi=10.1.1.157.3075&rep=rep1&type=pdf.
Adarve 2012: Adarve, J. D., Perrollaz, M., Makris, A. and Laugier, C. "Computing Occupancy Grids from Multiple Sensors using Linear Opinion Pools". IEEE International Conference on Robotics and Automation, May 2012. URL:https://hal.inria.fr/hal-00671211/document.
Birk 2006: Birk, A, and Carpin, S.; "Merging occupancy grid maps from multiple robots"; Proceedings of the IEEE, s vol. 94, No. 7, pp. 1384-1397, Jul. 2006. URL:https://citeseerx.ist.psu.edu/viewdoc/download?doi=10.1.1.658.2284&rep=rep1&type=pdf.

* cited by examiner

METHOD AND SYSTEM FOR COLLABORATIVELY DETECTING TANGIBLE BODIES IN AN ENVIRONMENT

CROSS-REFERENCE TO RELATED APPLICATIONS

This application claims priority to French patent application No. FR2009291, filed on Sep. 14, 2021, the disclosure of which is incorporated by reference in its entirety.

FIELD OF THE INVENTION

The invention relates to a method for collaboratively detecting tangible bodies in an environment, by means of sensors with which a plurality of carriers, certain of which are movable, and which are travelling through an environment, are equipped. The detection is "i collaborative" in the sense that data generated by a plurality of sensors with which separate carriers are equipped are fused to create a model of the environment. The latter is therefore a result of "collaboration" of the various carriers.

The invention is generally applicable to the field of perception and preferably to that of navigation of robots, drones, autonomous vehicles, etc.

BACKGROUND

There are two main families of perception techniques: geometric methods, which aim to identify the geometry of objects in the surrounding space, and those based on grid occupancy, which aim to determine whether a certain location is occupied by an obstacle (more generally, by a tangible body). The invention relates to techniques based on grid occupancy.

The theoretical foundations of perception methods based on occupancy grids are described in the article (Elfes 1990). The approach described in this article in particular allows information generated by a plurality of sensors, which need not be co-located, to be fused.

The article (Rakotoavao 2016) and patent application FR 3 041 451 discloses a method allowing the occupancy-probability fusion computations required by the method of (Elfes 1990) to be performed in an effective but nevertheless precise way using integer arithmetic.

The articles (Coué 2006), (Pathak 2007) and (Adarve 2012) and the thesis (Fernandez 2015), and the theses (Andrada Valente da Silva 2019) and (Trung-Dung 2009) disclose improvements to the method of (Elfes 1990) and its application to the fusion of information generated by a plurality of, identical or different, sensors borne by a given vehicle.

These methods only allow measurements generated by sensors with which a given carrier, for example an autonomous vehicle, is equipped to be exploited.

However, in many applications, a plurality of carriers equipped with sensors may be travelling through the same region of space, it is enough to think, for example, of a plurality of motor vehicles at a crossroads. In the prior art, these vehicles each compute an occupancy grid covering a limited portion of the environment. Furthermore, if the environment is dynamic and changing at a high rate, or when the carrier is moving, each occupancy grid will need to be frequently recomputed to satisfactorily represent the environment around the carrier. If this is not done, high uncertainties will be observed in the state of occupancy of the cells of the grid.

SUMMARY OF THE INVENTION

The invention aims to at least partially overcome these drawbacks of the prior art. More particularly, it aims to improve the quality—in terms of spatial extent and of uncertainty—of the perception of the environment in the case where a plurality of carriers equipped with sensors are travelling through an environment, and the position of which is known at least approximately (in the case of motor vehicles, an estimation of position may be delivered, for example, by a satellite positioning system).

According to the invention, this aim is achieved using a collaborative approach, in which the "local" occupancy grids corresponding to the measurements performed by the various carriers are fused into a "global" occupancy grid. One important aspect of the invention is that, when the cells of various local grids cover the same region of the environment, the occupancy probabilities of the corresponding cells of the global grid are computed via Bayesian fusion of the occupancy probabilities of the cells of the local grids. This allows the uncertainty in the state of occupancy of the cells of the local grid to be decreased, by optimally using all the available information.

The document (Birk 2006) describes a collaborative method in which a plurality of autonomous mobile robots conjointly acquire a map of the environment through which they are travelling. In this method, the robots move independently, exploring various regions of the environment, with a certain overlap, and generate local maps thereof. The robots do not know their relative positions, but the identification of identical regions in the local maps of various robots allows them to be registered in order to obtain a global map. The method does not allow the determination of the occupancy probabilities of cells corresponding to the regions of overlap of the local maps to be refined collaboratively. Specifically, the notion of occupancy probability is not exploited: the cells are considered to be occupied with certainty, or unoccupied with certainty, or to be in a completely unknown state, in which case they are ignored. The environment is considered to be static or almost static. Furthermore, the method does not allow an approximate knowledge of the position of the various robots at any given time to be exploited.

Document EP 3 121 762 describes a method in which a vehicle fuses the information delivered by its own sensors with data transmitted by other nearby vehicles, which are also equipped with sensors. This collaborative method does not however use occupancy grids, but a feature-based approach that does not allow a veritable map to be obtained and that requires a structured environment. Contrary to methods using occupancy grids, this approach does not therefore allow unknown environments to be mapped, and therefore the situation of carriers travelling through an unknown environment to be addressed.

One subject of the invention is therefore a method for collaboratively detecting tangible bodies in an environment, this method employing a plurality of distance sensors with which respective carriers located in said environment are equipped, at least one of said carriers being mobile, each sensor having a position and orientation that are known at least approximately with a known level of uncertainty, the method comprising:

A) for each sensor, acquiring a series of measurements of distance of a closest tangible body along a line of sight; applying, to each said measurement of distance, an inverse model of the sensor on a local occupancy grid providing a discretized spatial representation of its field of view, to determine a probability of occupancy by a tangible body of a set of cells of said occupancy grid; and constructing a consolidated local occupancy grid each cell of which has an occupancy probability computed via Bayesian fusion of the occupancy probabilities thus determined;

B) computing occupancy probabilities of the cells of a global occupancy grid via Bayesian fusion of the occupancy probabilities of corresponding cells of at least certain of said consolidated local occupancy grids corresponding to sensors with which separate carriers are equipped.

Another subject of the invention is a system for collaboratively detecting tangible bodies, comprising:
- a plurality of distance sensors with which respective carriers are equipped, at least one of said carriers being mobile;
- a plurality of locating devices with which at least said one or more mobile carriers are equipped, said locating devices being suitable for determining a position and an orientation of the carrier, and their levels of uncertainty; and
- a processing system configured or programmed to:
  for each sensor: acquire a series of measurements of distance of a closest tangible body along a line of sight; apply, to each said measurement of distance, an inverse model of the sensor on a local occupancy grid providing a discretized spatial representation of its field of view, to determine a probability of occupancy by a tangible body of a set of cells of said occupancy grid; and construct a consolidated local occupancy grid each cell of which has an occupancy probability computed via Bayesian fusion of the occupancy probabilities thus determined; and
  compute occupancy probabilities of the cells of a global occupancy grid via Bayesian fusion of the occupancy probabilities of corresponding cells of at least certain of said consolidated local occupancy grids corresponding to sensors with which separate carriers are equipped.

Particular embodiments of such a method and of such a system are the subject matter of the dependent claims.

DETAILED DESCRIPTION

Figure 1:
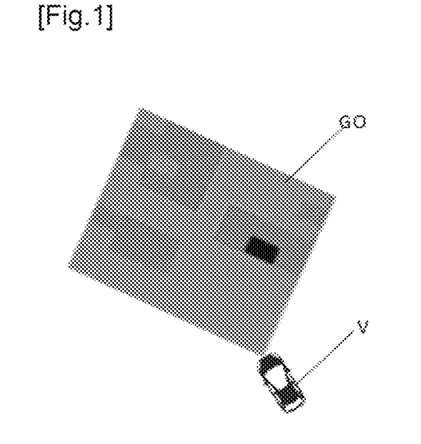
FIG. 1 shows an occupancy grid generated by a vehicle equipped with a distance sensor.

FIG. 1 shows an occupancy grid GO associated with a carrier (here a motor vehicle) V. The grid GO is defined in a coordinate system that is fixed to the vehicle V and occupies a region of the environment that corresponds at least partially to the field of view of one or more distance sensors located on-board the vehicle. The grid is a discretized spatial representation of the environment of the vehicle, and more precisely of the field of view of its one or more distance sensors. It is made up of a set of adjacent cells, each characterized by an occupancy probability, i.e. by the probability that the cell is occupied by an obstacle. These probabilities (represented in the figure by shades of grey) are computed from measurements taken by the one or more sensors, as explained in detail in the aforementioned article (Rakotovao 2016) and patent application FR 3 041 451. More precisely:

The (or each) sensor located on-board the vehicle V is considered to be "uncertain". This means that if an obstacle is located in a region of the environment corresponding to a cell $c_i$ of the occupancy grid, then the distance measurement z generated by the sensor will follow a probability distribution $p(z|o_i)$, where $p(a|b)$ is the probability density of the random variable a given event b and $o_i$ represents the event "the region of the environment corresponding to the cell $c_i$ of the occupancy grid contains an obstacle" (the expression "the cell $c_i$ is occupied" will be used for the sake of convenience). The probability distribution $p(z|o_i)$ is called the "direct model" of the sensor.

On the basis of the direct model of the sensor and of a priori occupancy probabilities $P(o_i)$ of the cells the "inverse model" of the sensor, i.e. $P(o_i|z)$, is computed, this model expressing the probability that each cell $c_i$ is occupied, given the acquisition of a distance measurement z:

$$P(o_i|z) = \frac{p(z|o_i)P(o_i)}{p(z)}$$

For example, a priori probabilities $P(o_i)$ identically equal to ½ may be used, this expressing complete uncertainty. Concretely, only cells located on the line of sight of the sensor see their occupancy probability modified with respect to their a priori value.

The direct computation of the inverse model of a sensor for a determined occupancy grid has a complexity that increases exponentially with the dimensions of the grid. The aforementioned article (Rakotovao 2016) and patent application FR 3 041 451 teach a much more efficient approximate method the complexity of which increases linearly.

The inverse model, which is stored in a memory, is applied to each measurement taken by the (or each) sensor. In general, a plurality of measurements are available, these being taken simultaneously or successively by one or more sensors; it is then possible to compute the occupancy probability of each cell via Bayesian fusion of these measurements.

If two measurements $z_1$ and $z_2$ are considered the following is for example obtained:

$$P(o_i|z_1 \wedge z_2) = \frac{P(o_i|z_1)P(o_i|z_2)}{P(o_i|z_1)P(o_i|z_2) + (1 - P(o_i|z_1))(1 - P(o_i|z_2))}$$

The generalization to more than two sensors is straightforward—it is enough to consider $P(o|z_1 \wedge z_2)$ to be the inverse model of a "virtual" sensor and to fuse it with the measurement delivered by a third sensor, and so on. The above equation is valid only if $P(o_i) = P(v_i) = \frac{1}{2}$, where $v_i$ corresponds to "the state of the cell $c_i$ is empty", but its generalization to other assumptions is easy, see for example EP 3 364 213.

Generally, the fusion of two probabilities $P_1$, $P_2$ is given by $$F(P_1, P_2) = \frac{P_1 \cdot P_2}{P_1 \cdot P_2 + (1 - P_1) \cdot (1 - P_2)}.$$

It is possible to consider that each distance measurement $z_1, z_2, \ldots$ allows a "provisional" occupancy grid to be constructed, often by updating only the occupancy probabilities of cells located on a line of sight of the distance sensor, and that the Bayesian fusion of these grids leads to a "consolidated" occupancy grid. Below, by "local occupancy grid" what will be meant, unless otherwise specified, is the consolidated occupancy grid for a carrier.

Bayesian fusion requires floating-point computations, which are expensive in computational resources; however the aforementioned article (Rakotovao 2016) and patent application FR 3 041 451 teach a much more efficient approximate method requiring only computations on integer variables.

One idea behind the invention is to construct, in the way described above, consolidated occupancy grids for a plurality of carriers, each equipped with one respective distance sensor (the generalization to the case where all or some of the carriers are equipped with a plurality of sensors poses no difficulty), then to fuse these occupancy grids—which may be qualified "local"- to construct a "global" occupancy grid. For example, the carriers may be motor vehicles being driven over a road network and, optionally, (fixed) infrastructure elements such as traffic lights also equipped with distance sensors.

Figure 2:
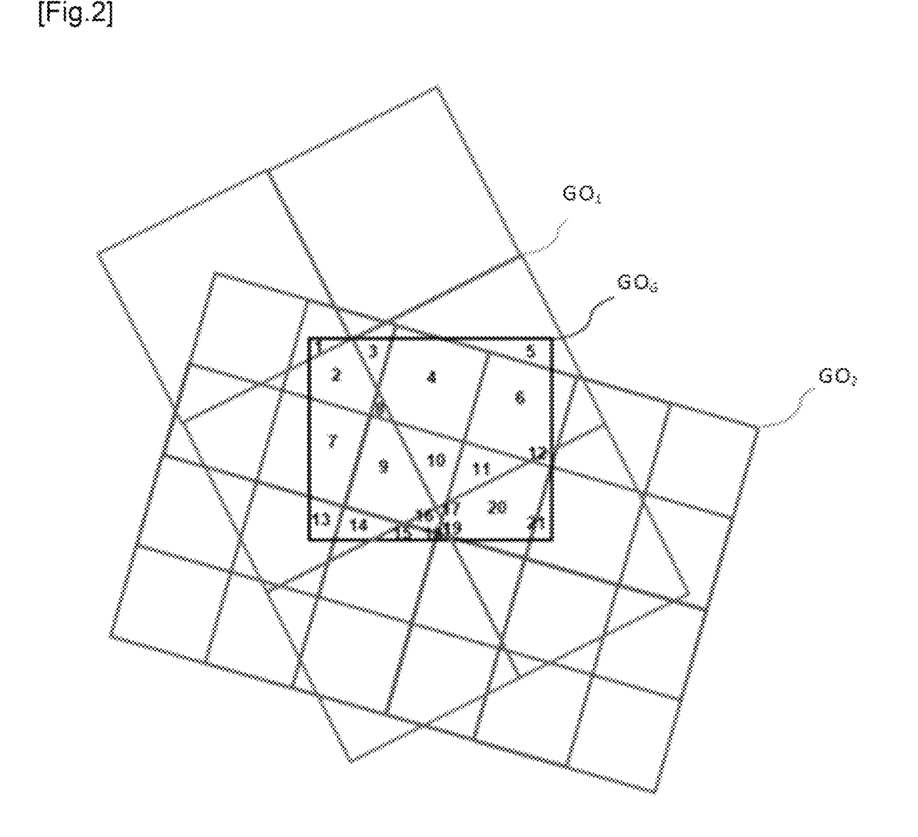
FIG. 2 illustrates the fusion of two unaligned occupancy grids (defined in different coordinate systems and with different cell sizes) according to a first embodiment of the invention.

FIG. 2 illustrates the fusion of two local occupancy grids $GO_1$, $GO_2$ to generate a global occupancy grid $GO_G$, only one cell $c_{Gk}$ of which has been shown. Typically, the local occupancy grids are computed via computers located on-board the respective carriers and transmitted via communication means—radio means for example—to a "central computer", with information on the position and orientation of the carrier (which information is obtained, for example, by means of a satellite navigation system). The central computer—which may be in a fixed station or be located on-board a carrier equipped with sensors, which generates its own local occupancy grid—computes the global occupancy grid.

It will be noted that, in general, the local occupancy grids are not aligned because they have different orientations, because they are defined in different frames of reference attached to carriers that are moving independently. Moreover, as in the case shown in the figure, they may have cells of different size. The global occupancy grid is defined in a coordinate system called the reference coordinate system.

According to a first embodiment of the invention, which embodiment is illustrated in FIG. 2, a plurality of regions corresponding to superpositions of various cells of the local grids $GO_1$, $GO_2$ are identified in the interior of the cell $c_{Gk}$ of the global occupancy grid. These regions have been numbered from 1 to 21 in the figure. For each of these regions an occupation probability is determined via Bayesian fusion of the occupancy probabilities of the local cells in question (it will be recalled that a cell is considered to be "occupied" if an obstacle has been detected in this cell, without the obstacle necessarily occupying the entirety of the cell). Next, an occupancy probability of the cell $c_{Gk}$ is computed from the occupancy probabilities of these regions. For example, the entire cell may be assigned the highest occupancy probability among those computed for the regions thereof.

The drawback of this approach is its computational complexity: in the example of FIG. 2, one Bayesian-fusion operation is required to compute the occupancy probability of each region of the cell $c_{Gk}$ of the global grid, i.e. 21 Bayesian-fusion operations to compute for $c_{Gk}$. It is then necessary to use a mechanism that computes a single occupancy-probability value for the cell $c_{Gk}$, for example one employing a maximum function. Furthermore, the number of operations increases exponentially with the number of local occupancy grids as it is desired to fuse. A second and a third embodiment of the invention allow this difficulty to be overcome.

Figure 3:
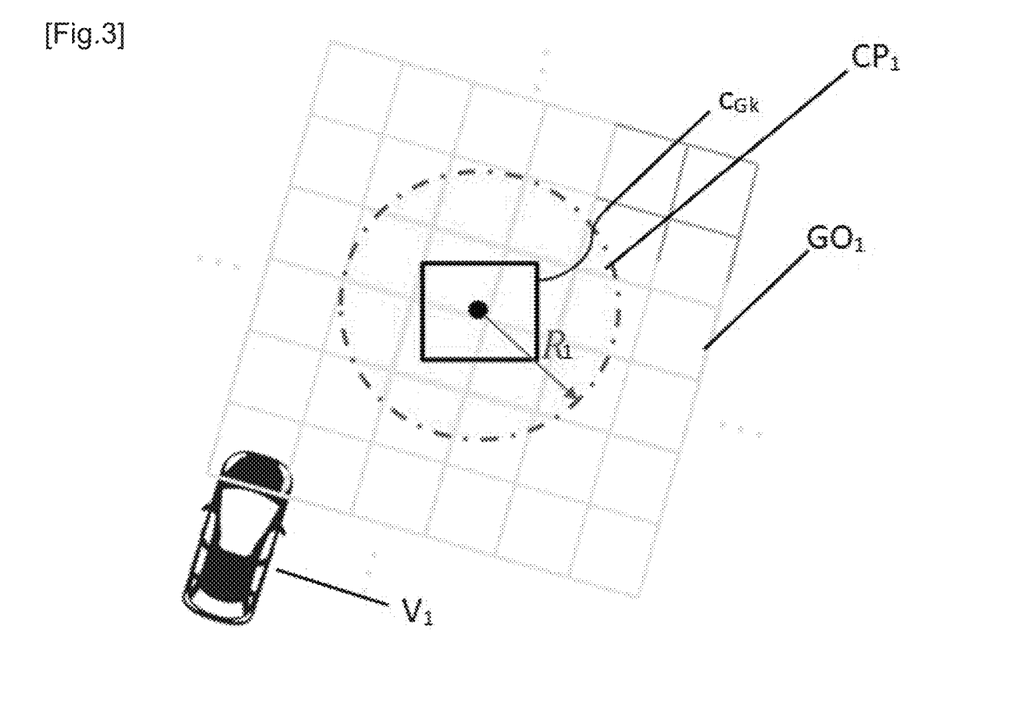
FIG. 3, FIG. 4, and FIG. 5 illustrate the selection of cells of the occupancy grid of a vehicle that are "close" to a cell of a global occupancy grid, and the determination of their level of proximity, according to a second embodiment of the invention.
Figure 4:
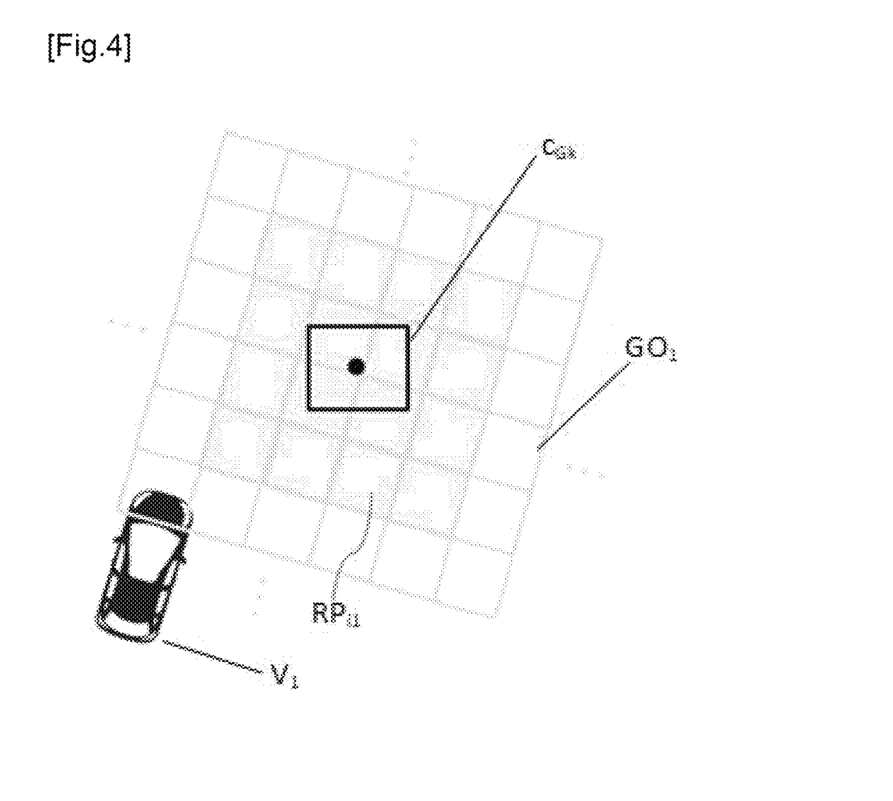

The computation of a global occupancy grid according to a second embodiment is illustrated in FIG. 3 to FIG. 6. It comprises the following steps: which are implemented for each cell $c_{Gk}$ of the global occupancy grid:

Firstly, cells of each (consolidated) local occupancy grid that may be considered—via application of a predefined proximity criterion—"close" to said cell of the global occupancy grid are identified. Only these cells contribute to the computation of the occupancy probability of $c_{Gk}$. For example, as illustrated in FIG. 3 and FIG. 4, those cells of the local occupancy grid $GO_1$ associated with the carrier (vehicle) $V_1$ that are located at least partially inside a circle $CP_1$ of radius $R_1$ the centre of which coincides with that of the cell $c_{Gk}$ may be considered "close" to the cell $c_{Gk}$. Advantageously, the radius $R_1$ increases as the uncertainty in the position of $V_1$ increases (satellite navigation systems, for example, not only allow a position to be estimated, but also the uncertainty affecting this estimation to be known). FIG. 3 shows the boundary disc $CP_1$ and FIG. 4 shows the region $RP_{i1}$ of the occupancy grid $GO_1$ formed by the cells that intersect the boundary disc $CP_1$ and that are therefore considered close to $c_{Gk}$.

Next, for each cell $RP_{i1}$, a level of proximity with the cell $c_{Gk}$ is computed. It should be noted that the proximity criterion used to identify the cells forming part of $RP_{i1}$ is binary—it is met or it is not—whereas the level of proximity may take a plurality of discrete or continuous values. For example, the level of proximity may be the normalized probability density, computed at the centre of the identified cell, this denoting a probability value such that this cell coincides with the centre of the cell of the global occupancy grid, or a (typically monotonic) function bounded between 0 and 1 of this probability. Specifically, given that the position and orientation of the carrier $V_1$ are known only with a certain imprecision, the position with respect to $c_{Gk}$ of the centre of each cell of $GO_1$ is described by a probability distribution.

Next, a contribution of the local occupancy grid $GO_1$ to the occupancy probability of the cell $c_{Gk}$ is computed via a weighted mean of the occupancy probabilities of the cells of $RP_{i1}$, the weighting coefficients being dependent on the corresponding levels of proximity (a coefficient becomes higher as the corresponding cell $RP_{1i}$ gets closer to $c_{Gk}$; for example, it may depend on the inverse of the level of proximity).

Lastly, the various contributions due to the various local occupancy grids are fused (Bayesian fusion) to find the occupancy probability of the cell $c_{Gk}$. To do this, the methods described in (Coue 2006), (Pathak 2007), (Adarve 2012), (Fernandez 2015) may be used, or indeed the "integer fusion" technique disclosed by (Rakotovao et al. 2016) and WO2017/050890 may advantageously be applied.

Instead of proceeding cell by cell of the global occupancy grid, it is possible to associate, with each local occupancy grid $GO_j$, an intermediate local occupancy grid, the geometry (position, orientation, number, shape and arrangement of the cells) of which is identical to that of the global occupancy grid. The occupancy probability of each cell of the intermediate local occupancy grid is computed from the occupancy probabilities of the cells of $GO_j$, as described above. In other words, the local occupancy grids are projected into the reference coordinate system of the global occupancy grid. Lastly, all the intermediate local occupancy grids are fused to obtain the global occupancy grid, this posing no difficulty because these grids are defined in the same coordinate system. The two approaches are similar and differ only in the order in which the operations are carried out. In one case, the occupancy probability of a cell $c_{gk}$ of the occupancy grid is computed, taking into account all the contributions at once. In the other case, firstly the contributions of each local occupancy grid to all the cells of the global occupancy grid are computed, then these contributions are fused.

Figure 5:
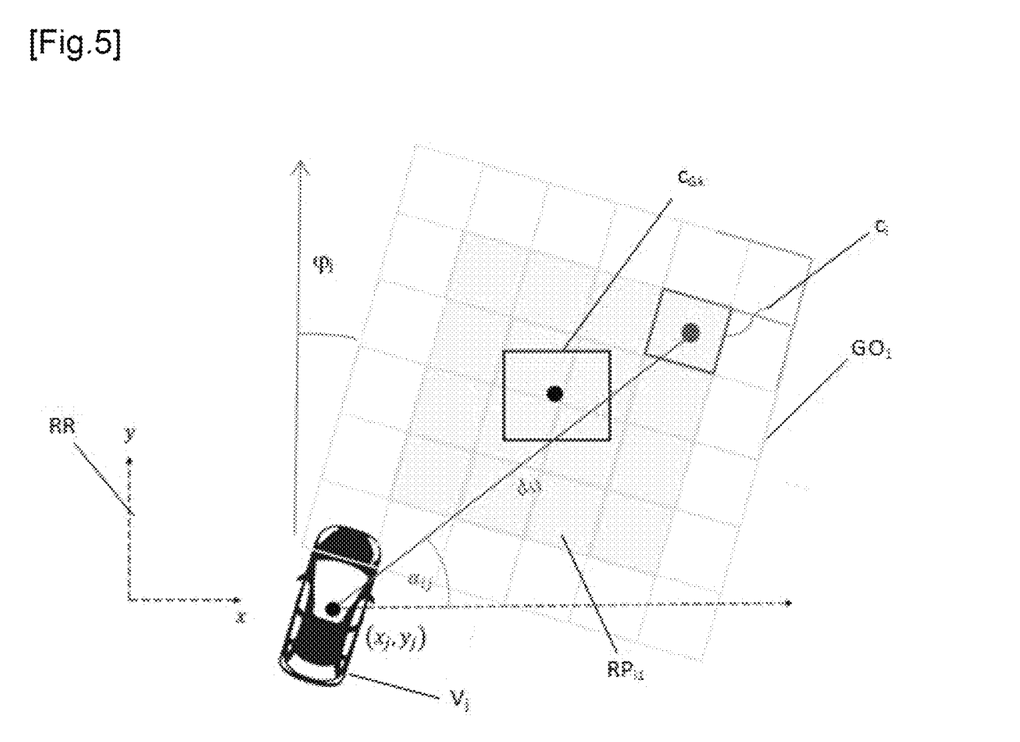

The computations required to implement a method according to this second embodiment of the invention will now be described in more detail with reference to FIG. 5.

Let a carrier $V_j$ be positioned at $(x_j, y_j)$ on the global grid and let a cell $c_i$ (selected beforehand using the procedure described above) of its (local) grid of coordinate system j associated with the carrier $V_j$, be positioned at $(x_{ij}, y_{ij})$ with respect to the reference coordinate system RR (x, y). The two coordinates systems differ by a rotation of angle $\varphi_j$. The position of a carrier is considered to be defined by the position of a point inside said carrier, for example its centroid, and the position of a cell is considered to be defined by its centre (as a variant, one of its vertices could also be chosen). The relationship between the positions of the carrier $V_j$ and of the cell $c_i$ in the reference coordinate system is given by the equations $$x_{ij} = x_j + d_{ij}\cos(\alpha_{ij})$$

$$y_{ij} = y_j + d_{ij}\sin(\alpha_{ij})$$

where $(x_j, y_j)$ is the estimate of the position of the carrier, which position may be modelled using random variables (for example Gaussian variables of average $(\bar{x}_j, \bar{y}_j)$ and variances $(\sigma_{x_j}^2, \sigma_{y_j}^2)$), and $\alpha_{ij}$ is the estimate of the orientation of the straight line connecting the position of the carrier with the centre of the cell $c_i$ in the reference coordinate system, which may also be modelled using a random variable (for example a truncated Gaussian variable of average $\bar{\alpha}_{ij}$ and of variance $\sigma_{\alpha_j}^2$). The distance $d_{ij}$ between the carrier and the cell $c_i$ is considered to remain constant, because the local grid that contains the cell $c_i$ is attached to the vehicle.

On the basis of the above equations and knowledge of the probability distributions $x_j$, $y_j$ and $\alpha_{ij}$, it is possible to determine the conjoint probability distribution of the variables $(x_{ij}, y_{ij})$, namely $f(x_{ij}, y_{ij})$.

To determine $f(x_{ij}, y_{ij})$, various approaches may be used: histogram (numerical), characteristic function, Jacobian matrix, differential forms. If for example the estimate of the position of the carrier is considered to be modelled by a Gaussian random variable of probability density $f_{xy}(x_j, y_j)$, with $x_j$ and $y_j$ independent and $\sigma = \sigma_{x_j} = \sigma_{y_j}$, the orientation of the vehicle is considered to follow a truncated Gaussian probability distribution given by $$f_\alpha(\alpha_{ij}) = \begin{cases} \dfrac{1}{\sqrt{2\pi}\,\sigma_{\alpha_j} \mathrm{erf}\left(\dfrac{\pi}{\sqrt{2}\,\sigma_{\alpha_j}}\right)} \exp\left\{-\dfrac{1}{2\sigma_{\alpha_j}^2}(\alpha_{ij} - \bar{\alpha}_{ij})^2\right\} & \text{if } \bar{\alpha}_{ij} - \pi \leq \alpha_{ij} \leq \bar{\alpha}_{ij} - \pi \\ 0 & c.c. \end{cases}$$

Using differential forms, that the probability element be $$f(x_{ij}, y_{ij}, \partial\alpha_{ij})|dx_{ij} \times dy_{ij} \times d\theta_{ij}|,$$

where $\theta_{ij} = \alpha_{ij}$ and $dx_{ij} \times dy_{ij} \times d\theta_{ij}$ is the exterior product. It may be deduced that $$|dx_{ij} \times dy_{ij} \times d\theta_{ij}| = |d(x_j + d_{ij}\cos(\alpha_{ij})) \times d(y_j + d_{ij}\sin(\alpha_{ij})) \times d\alpha_{ij}| \Rightarrow |dx_{ij} \times dy_{ij} \times d\theta_{ij}| = |(dx_j - d_{ij}\sin\alpha_{ij}d\alpha_{ij}) \times (dy_j + d_{ij}\cos\alpha_{ij}d\alpha_{ij}) \times (d\alpha_{ij})| \Rightarrow |dx_{ij} \times dy_{ij} \times d\theta_{ij}| = |dx_j \times dy_j \times d\alpha_{ij}| = dx_j dy_j d\alpha_{ij},$$

taking into account the property $d\alpha_{ij} \times d\alpha_{ij} = 0$ (i.e. the exterior product is alternating). Thus, the probability element may be rewritten as:

$$f(x_{ij}, y_{ij}, \theta_{ij})|dx_{ij} \times dy_{ij} \times d\theta_{ij}| == f(x_j + d_{ij}\cos(\alpha_{ij}), y_j + d_{ij}\sin(\alpha_{ij}), \alpha_{ij})|dx_{ij} \times dy_{ij} \times d\theta_{ij}| == f_{xy}(x_j, y_j) f_\alpha(\alpha_{ij}) dx_j dy_j d\alpha_{ij},$$

With $\alpha_{ij}$ independent of $x_j$ and $y_j$. Therefore, $$f(x_{ij}, y_{ij}) = \int_{-\infty}^{\infty} f(x_{ij}, y_{ij}, \theta_{ij}) d\theta_{ij} =$$

$$\int_{-\infty}^{\infty} f_{xy}(x_{ij} - d_{ij}\cos(\alpha_{ij}), y_{ij} - d_{ij}\sin(\alpha_{ij})) f_\alpha(\alpha_{ij}) d\alpha_{ij} \Rightarrow f(x_{ij}, y_{ij}) =$$

$$g(x_{ij}, y_{ij}) \int_{\alpha_{ij} - \pi}^{\alpha_{ij} + \pi} \exp\left\{\frac{d_{ij}}{\sigma^2}[(x_{ij} - \bar{x}_j)\cos\alpha_{ij} + (y_{ij} - \bar{y}_j)\sin\alpha_{ij}]\right\}$$

$$\exp\left\{-\frac{1}{2\sigma_{\alpha_j}^2}(\alpha_{ij} - \bar{\alpha}_{ij})^2\right\} d\alpha_{ij}$$

where $g(x_{ij}, y_{ij}) = \dfrac{\exp\left\{-\dfrac{1}{2\sigma^2}[d_{ij}^2 + (x_{ij} - \bar{x}_j)^2 + (y_{ij} - \bar{y}_j)^2]\right\}}{(2\pi)^{3/2}\sigma^2 \sigma_{\alpha_j} \mathrm{erf}\left(\dfrac{\pi}{\sqrt{2}\,\sigma_{\alpha_j}}\right)}.$ The integral may be solved numerically.

The function $f(x_{ij}, y_{ij})$ allows the level of proximity between the cell $c_i$ of the grid $GO_i$ and the cell $c_{Gk}$ of the global grid $GO_G$ (in black) to be quantified. More precisely, the level of proximity is defined by the value $$\delta_{ijk} = \frac{f(x_{ij} = x_{Gk}, y_{ij} = y_{Gk})}{\max(f(x_{ij}, y_{ij}))},$$

where $(x_{Gk}, y_{Gk})$ is the position of the cell $c_{Gk}$ in the reference coordinate system. The quantity $\delta_{ijk}$ is a probability that the centre $c_i$ of the cell of the grid $GO_i$ coincides with that of the cell $c_{Gk}$ of the global grid $GO_G$. The level of proximity $\delta_{ijk}$ is determined for each selected cell $c_i$ in the vicinity of each cell $c_{Gk}$ of the reference coordinate system of carrier $V_j$, as was explained above with reference to FIG. 3 and to FIG. 4.

In the case of a fixed carrier (infrastructure element) the position of which is known with certainty, $\delta_{ijk}=1$ is defined directly for all the selected cells. In the case of a mobile carrier, the normalization of $\delta_{ijk}$ by max is necessary because $f(x_{ij}=x_{Gk}, y_{ij}=y_{Gk})$ may be higher than 1; without normalization the paradoxical situation of a level of proximity higher than that achievable in the case of a stationary carrier would be obtained.

Once the levels of proximity $\delta_{ijk}$ have been computed, the occupancy probability in the coordinate system of a carrier $V_j$ is projected onto the reference coordinate system. Let $P_{ij}$ be the occupancy probability of cell $c_i$ of the coordinate system j, which probability is determined using the distance sensors installed on the carrier; the occupancy probability of cell $c_{Gk}$ of the reference coordinate system is then defined for carrier $V_j$ by:

$$P_{jk} = \frac{\sum_i \delta_{ijk} P_{ij}}{\sum_i \delta_{ijk}}.$$

The probability $P_{jk}$ is therefore a weighted mean of the occupancy-probability values of the cells selected beforehand in the grid $GO_j$ the weights of which are measurements of the positional proximity of these cells with respect to the cell $c_{Gk}$ of the reference coordinate system.

With this procedure, it is possible to construct the occupancy grids of all the carriers in a given coordinate system with a limited computational complexity. In particular, to decrease the cost of computation, the result of certain intermediate computations could be saved in a table. At this point, the fusion of these occupancy grids poses no particular difficulty and may be carried out advantageously by applying the "integer fusion" technique disclosed by (Rakotovao et al. 2016) and WO2017/050890.

Figure 6:
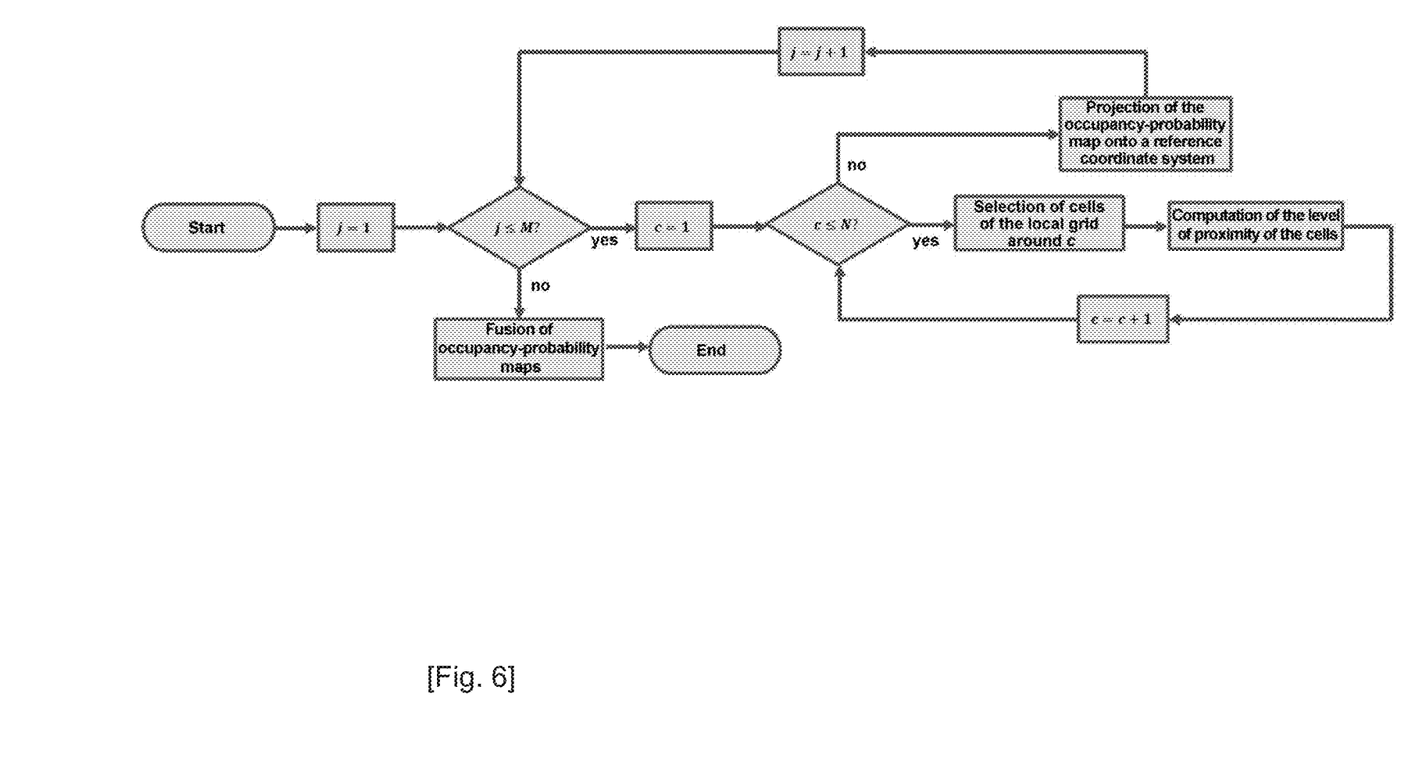
FIG. 6 is a flowchart of a method according to said second embodiment of the invention.

FIG. 6 is a flowchart of a method according to the second embodiment of the invention. The method of the figure relates to a situation in which M carriers $V_j$ (identified by the index j, j taking values from 1 to M) each deliver one local occupancy grid. The global occupancy grid comprises N cells c. For each carrier (iteration loop over j), the corresponding local occupancy grid is projected onto an intermediate local occupancy grid having the same geometry as the global occupancy grid (nested iteration loop for each cell c); then the intermediate local occupancy grids are fused. As explained above, as a variant, another way of proceeding would be to consider the cells of the global occupancy grid one by one and, for each thereof, to compute and fuse the occupancy-probability contributions due to all the local occupancy grids.

In the second embodiment of the invention that has just been described, each carrier (or more precisely the computer located on-board each carrier) generates a local occupancy grid in its own coordinate system and transmits it to the central computer, which projects all these local grids into a reference coordinate system in order to fuse them and obtain the global occupancy grid. In the third embodiment, the orientation and position of the reference coordinate system are transmitted by the central computer to the carriers, which then generate their local occupancy grids directly in this coordinate system. The local occupancy grids thus generated may then be sent to the central computer, which fuses them.

Figure 7:
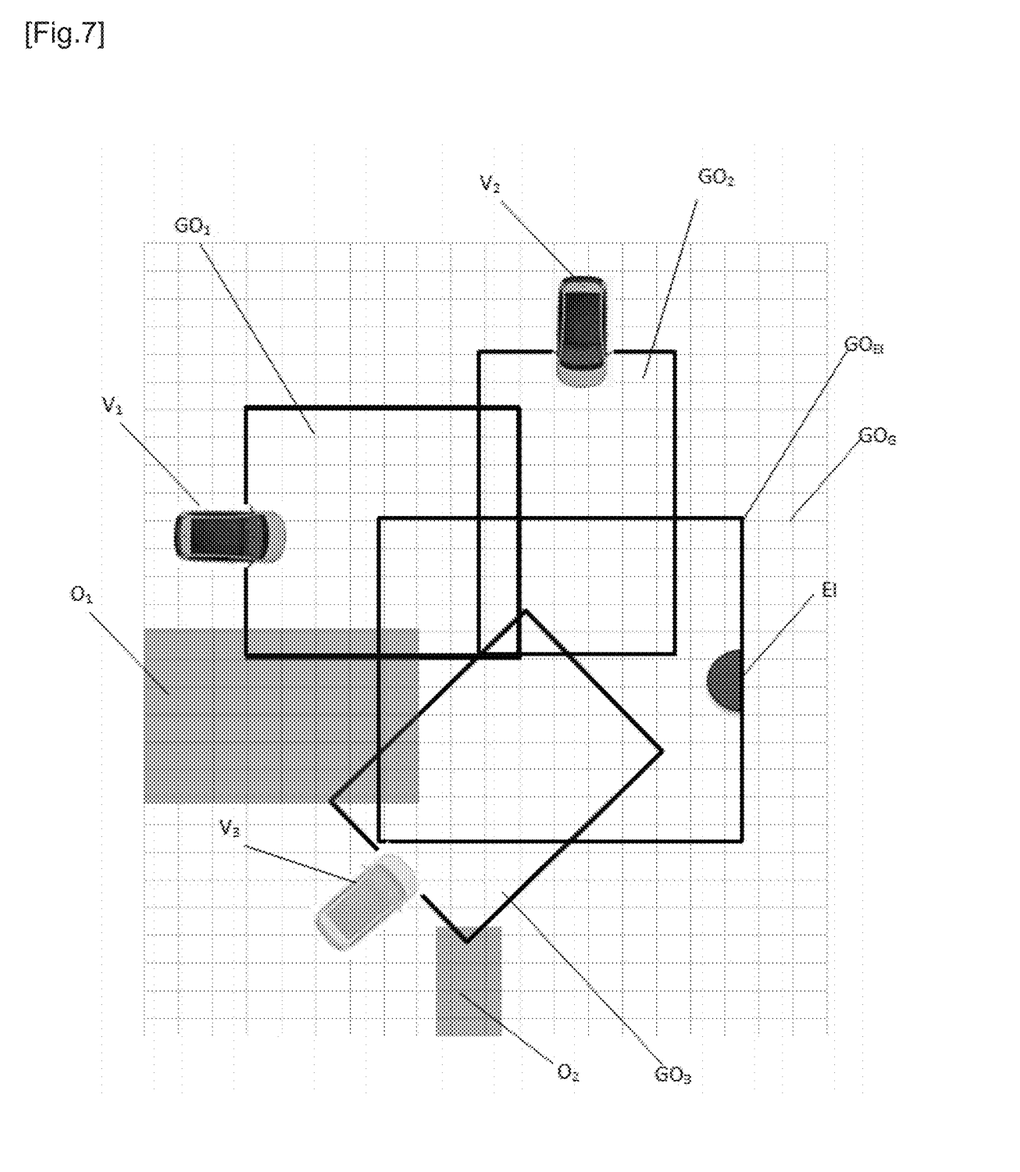
FIG. 7, FIG. 8, FIG. 9, FIG. 10, FIG. 11, and FIG. 12 illustrate the steps of a method according to a third embodiment of the invention.
Figure 8:
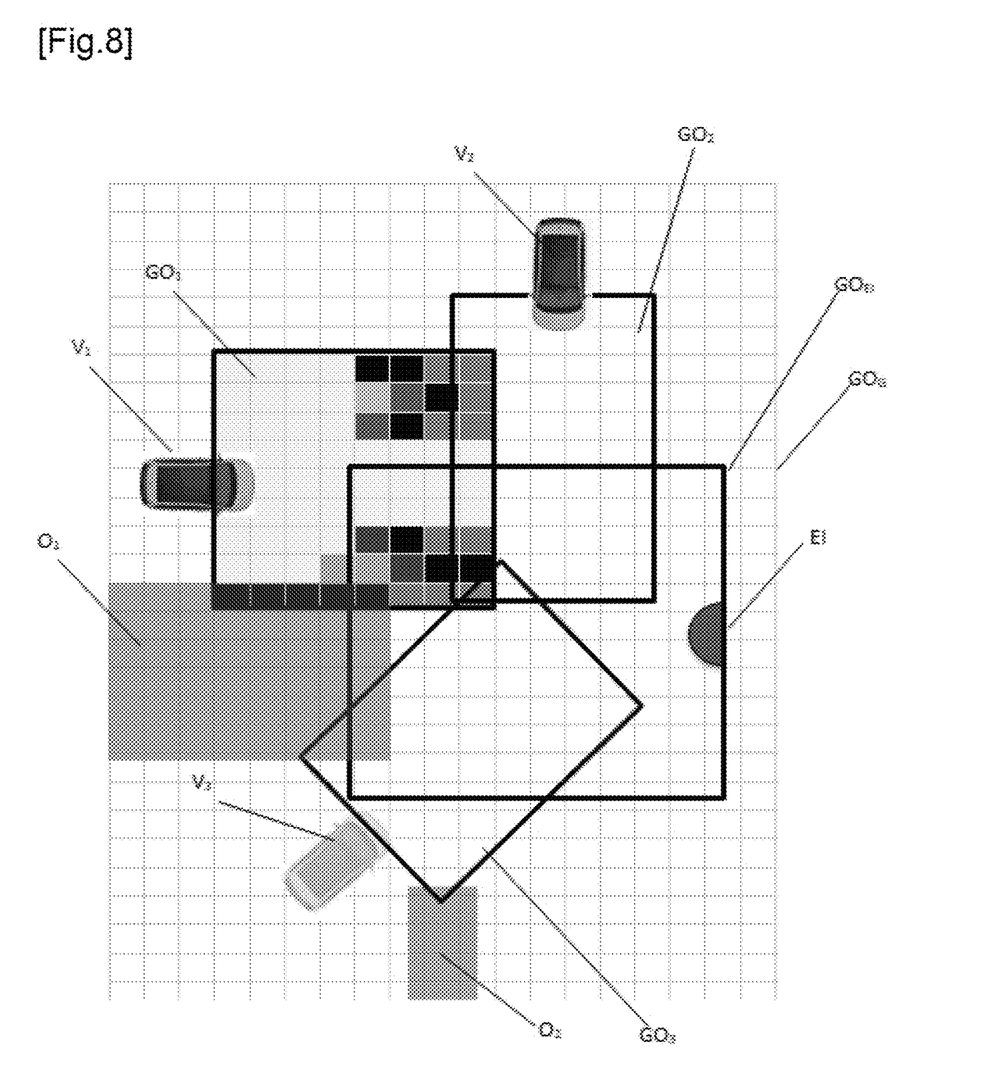
Figure 9:
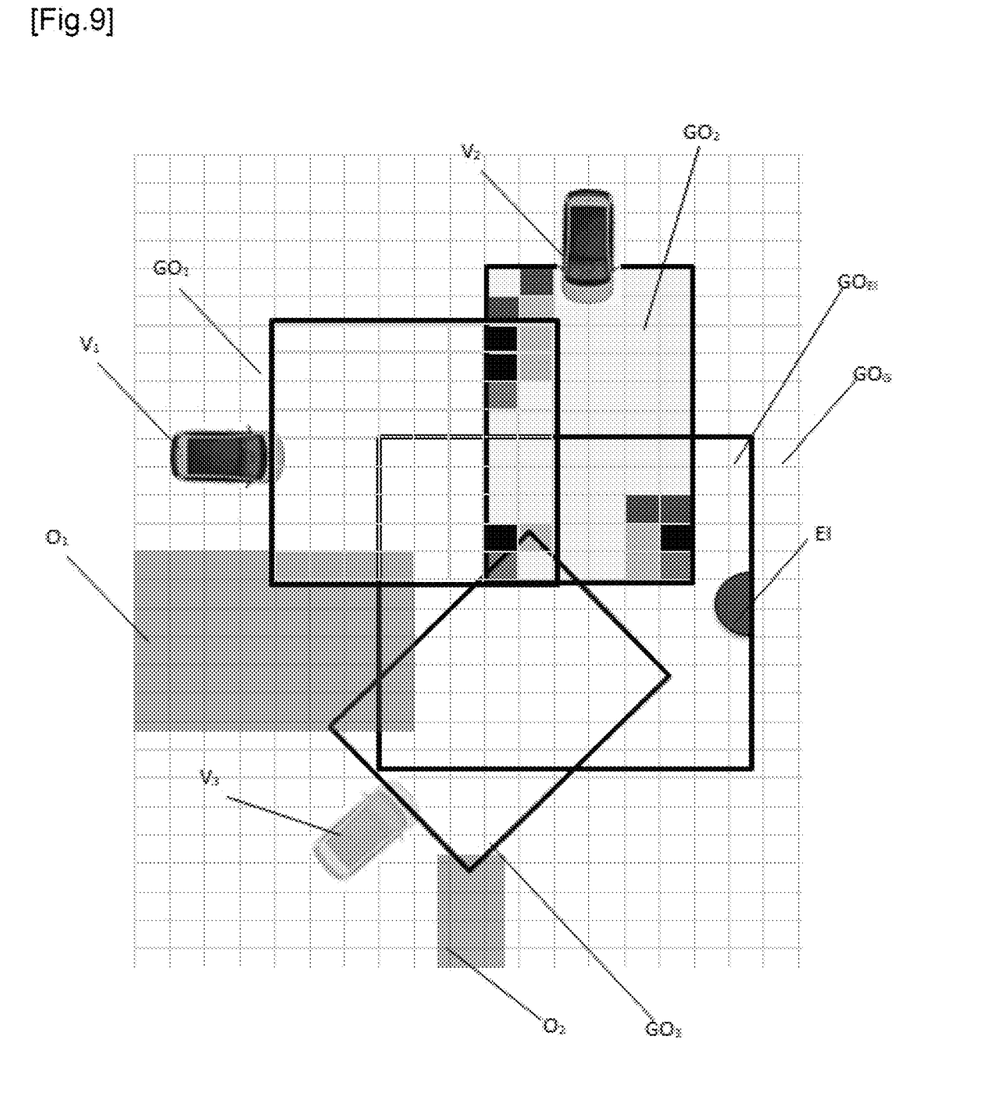
Figure 10:
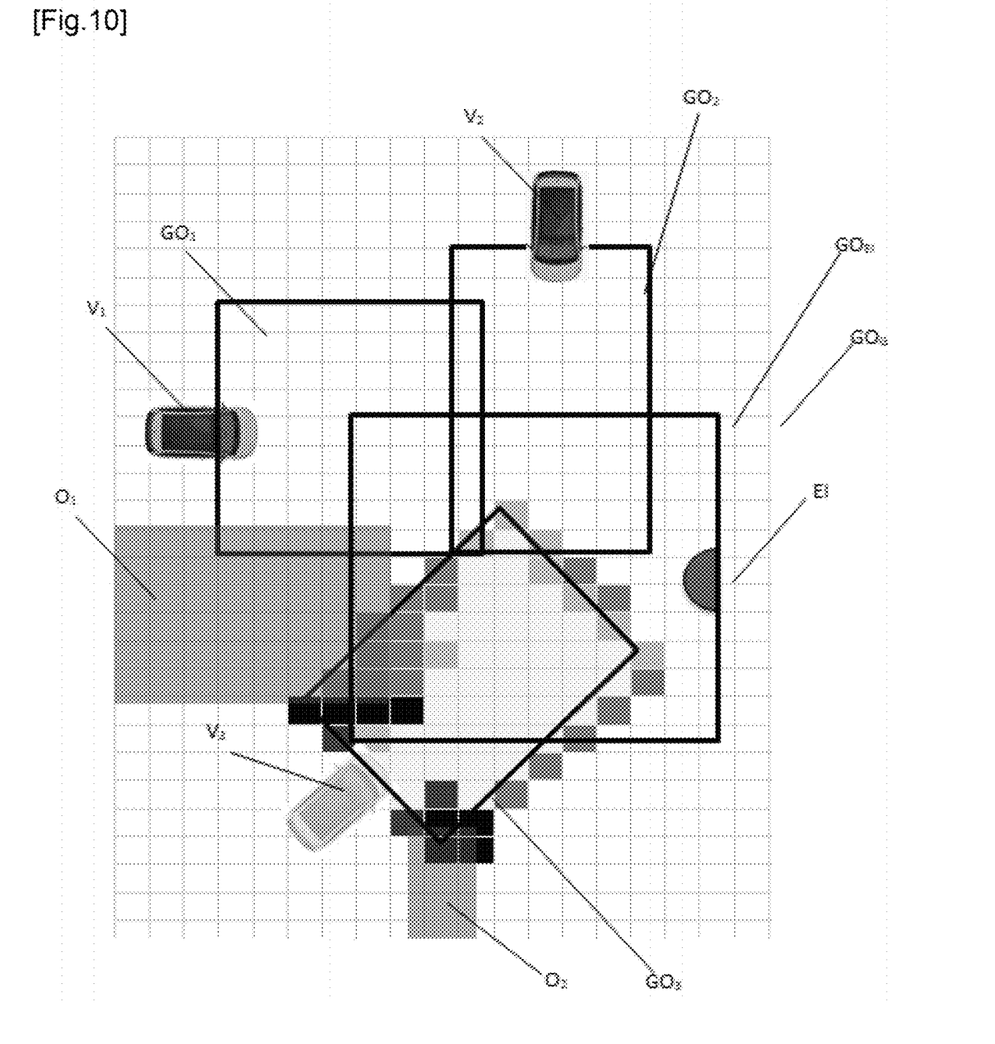
Figure 11:
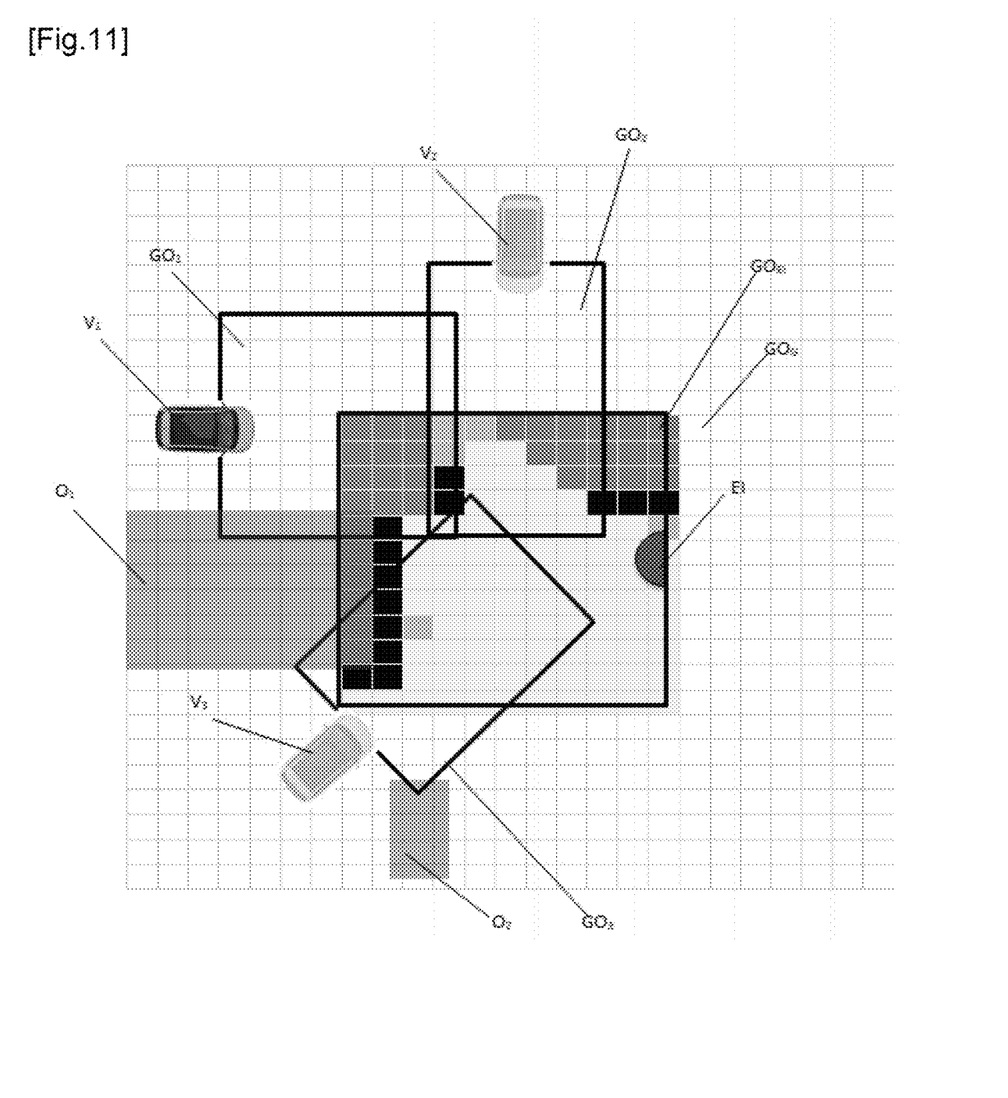

FIG. 7 shows three mobile carriers (automobiles) $V_1$, $V_2$, $V_3$ and a fixed carrier (infrastructure element) EI with respective local occupancy grids $GO_1$, $GO_2$, $GO_3$ $GO_{EI}$ that are "empty", i.e. before the occupancy probabilities of their cells have been computed. Two obstacles $O_1$, $O_2$ are also present. A central computer, which is for example co-located with the infrastructure element EI, transmits to the computers located on-board the mobile carriers (and, where appropriate, on the infrastructure element) data defining a global coordinate system: an origin and the orientation of the axes $x_G$, $y_G$. A global occupancy grid $GO_G$—which is also "empty"—has been represented in the figure by a square grid.

Each mobile carrier determines, for example by means of a satellite navigation system, its position with respect to the origin of the global coordinate system, and the uncertainty in its position (for a static carrier such as EI, the position is assumed to be known without uncertainty). A probability distribution of the position of carrier $V_i$ number "i" $p(x_i, y_i)$ may therefore be computed, for example assuming that this distribution is a multidimensional normal distribution.

The on-board computer of each carrier receives a succession of distance measurements and uses them to compute the local occupancy grid, using the inverse model of the distance sensor and the position probability $p(x_i, y_i)$. The uncertainty in the position is therefore taken into account.

Let $z^{t-1}$ be the sequence of distance measurements $\{z_1, \ldots z_{t-1}\}$ acquired before the time t and z the measurement acquired at the time t. The probability that cell "j" of the occupancy grid is occupied is designated $P(o_j|z, z^{t-1})$, this probability being conditional on the measurements z and $z^{t-1}$. It is possible to demonstrate that:

$$P(o_i|z, z^{t-1}) = \frac{P(o_i|z)P(o_i|z^{t-1})}{P(o_i|z)P(o_i|z^{t-1}) + (1 - P(o_i|z))(1 - P(o_i|z^{t-1}))}$$

with $$P(o_i|z) = \sum_{x_i, y_i} P(o_i|z, x_i, y_i) P(x_i, y_i)$$

where $P(o_i|z, x_i, y_i)$ is the inverse model of the sensor, which is computed assuming that the position of the carrier is $(x_i, y_i)$, $P(x_i, y_i)$ is the probability that the position of the carrier is actually $(x_i, y_i)$ and the sum is computed for every possible position ($x_i$ and $y_i$ are here considered to only take discrete values, this justifying the passage from a probability density—represented by a lowercase "p"- to a probability represented by an uppercase "P").

Only the uncertainty in the position of the carrier is considered here, but the uncertainty in its orientation may be taken into consideration in the same way ("stance" may be spoken of to designate both the position and orientation of a carrier).

Figure 12:
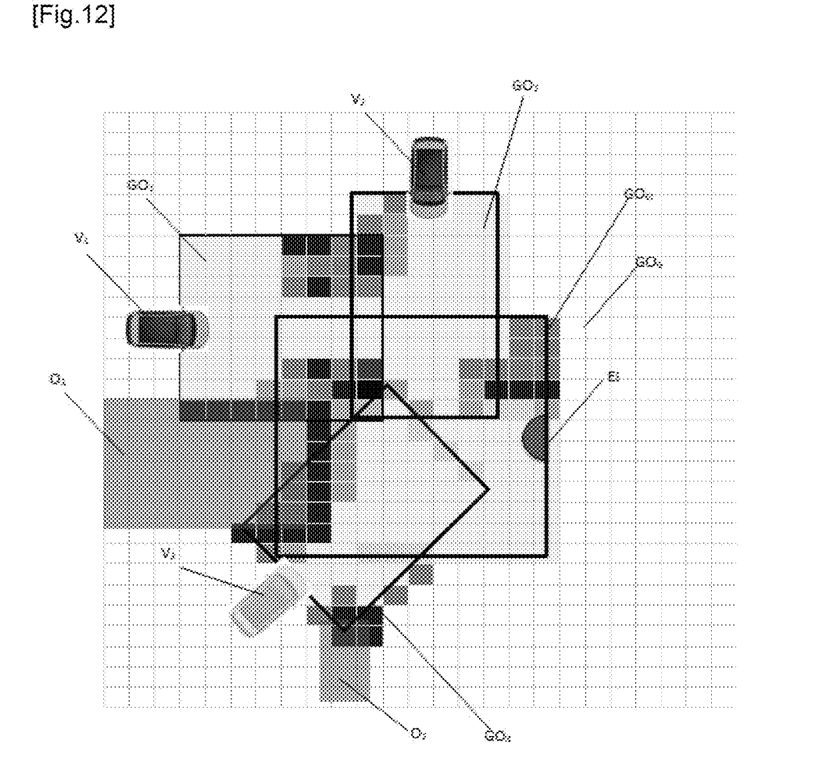

FIG. 8, FIG. 9, FIG. 10 and FIG. 11 show the local occupancy grids $GO_1$, $GO_2$, $GO_3$ and $GO_{EI}$ of the carriers $V_1$, $V_2$, $V_3$ and EI, respectively. It will be noted, in the case of $V_3$, that the cells of the local occupancy grid are aligned with the reference coordinate system, and not with that of the carrier. FIG. 12 shows the global occupancy grid $GO_G$ obtained by fusion.

Whatever the embodiment in question, the global occupancy grid may be transmitted by the central computer to the on-board computers. The central computer, moreover, is not necessarily "fixed": it is possible to use, by way of central computer, a computer located on-board a carrier.

The invention has been described with respect to two-dimensional occupancy grids, but the generalization to the three-dimensional case is straightforward.

The invention has been described with respect to the case where each carrier is equipped with a single distance sensor, but the generalization to the case where at least some of the carriers are equipped with a plurality of sensors is straightforward.

Although not essential, it is advantageous to apply the "integer fusion" technique disclosed by (Rakotovao et al. 2016) and WO2017/050890, and which was briefly recalled above.

The idea behind this technique is that, although the probabilities to be fused may in principle take any value in the interval [0, 1], in practice the computations are necessarily performed on discrete values. Therefore, a probability in the interval [0, 1] must necessarily be represented in a discrete manner, by "probability classes" that may be identified by integer indices. A countable subset of the interval [0, 1] the elements $p_n$ of which are identified by a relative integer index "n" is called a "system of probability classes" $S=\{p_n, n \in \mathbb{Z}\}$. Certain systems of probability classes have the property that the fusion of any two probability classes of the system also belongs to the system. Formally $\forall p_i, p_j \in S$, $F(p_i, p_2) \in S$. In this case reference is made to "systems of errorless classes" because the fusion operation introduces no error or approximation (the discretization, however, is an approximation). The advantage of these classes is that the result of the fusion is also identified by an integer index. The probability-fusion problem therefore boils down to determining a function $F_d$ that associates with a pair of integer indices another integer index. Floating-point operations on probability values are therefore replaced by integer operations on indices.

One advantageous discretization scheme is based on a countable set $S_k$ of probability classes that is given by the union of the following two subsets:

$$S_k^- = \left\{\frac{1}{2-k \cdot n}, n \leq 0\right\}$$

$$S_k^+ = \left\{\frac{k \cdot n + 1}{k \cdot n + 2}, n \geq 0\right\}$$

where k is a positive integer ($k \in \mathbb{N}^*$). $S_k$ discretizes the interval [0, 1] nonuniformly, with a discretization interval that is relatively large about the value 0.5 and increasingly small as the extreme values 0 and 1 are approached. This is doubly advantageous; specifically:

a probability of 0.5 corresponds to a complete uncertainty; it is therefore not very useful to be very precise around such a value; in contrast, it is useful to be precise around the extreme values that correspond to quasi-certainties of non-occupancy (0) or of occupancy (1).

beyond a certain value of |n|, the discrete probability values get extremely close to one another; the error introduced by truncating the set is therefore negligible.

Although $S_k$ is not an errorless system, Sk+ and Sk− are.

Another, errorless, useful quantification system is defined by recursion:

$p_0 = 0, 5;$ $p_1 = p;$ $p_2 = F(p, p);$ $p_3 = F(p_2, p);$

...

$p_{n+1} = F(p_m, p)$ $p_{-1} = 1 - p;$ $p_{-2} = F(p_{-1}, p_{-1});$ $p_{-3} = F(p_{-2}, p_{-1});$

...

$p_{n-1} = F(p_n, p_{-1})$ where "p" is a parameter such that 0.5<p<1 and $$F(p_i, p_j) = \frac{p_i p_j}{p_i p_j + (1-p_i)(1-p_j)}.$$

Figure 13:
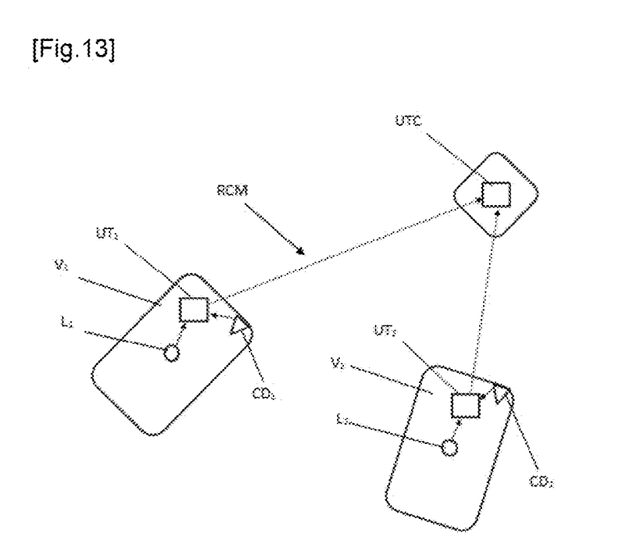
FIG. 13 is a conceptual schematic of a system according to a fourth embodiment of the invention.

FIG. 13 shows very schematically a system for implementing a method according to the invention. The system comprises distance sensors $CD_1$, $CD_2$, locating devices $L_1$, $L_2$ and computers (more generally local processing units) $UT_1$, $UT_2$, with which respective carriers $V_1$, $V_2$ are equipped. The distance sensors and the locating devices deliver, to the processing unit of the carrier, the distance measurements and position and orientation information required to construct the local occupancy grids. The local processing units exchange data with a central processing unit UTC via a communication network RCM, which typically is wireless. The central processing unit UTC constructs a global occupancy grid from the local occupancy grids and the position of the carriers $V_1$ and $V_2$.

The local and global processing units may be computers, microprocessors or microcontrollers, dedicated or programmable digital circuits, etc., programmed or configured to implement the processing operations described above. The locating devices may be or comprise receivers of satellite navigation signals, inertial measurement units, etc.

BIBLIOGRAPHIC REFERENCES

Elfes 1990: A. Elfes, "Occupancy grids: a stochastic spatial representation for active robot perception" (Sixth Conference on Uncertainty in AI, 1990).
Rakotovao 2016: T Rakotovao, J Mottin, D Puschini, C Laugier, "Multi-sensor fusion of occupancy grids based on integer arithmetic", Robotics and Automation (ICRA), 2016 IEEE International Conference on, 1854-1859.
Coué 2006: Coue, C., Pradalier, C., Laugier, C., Fraichard, T. and Bessiere, P. "Bayesian Occupancy Filtering for Multitarget Tracking: An Automotive Application". The International Journal of Robotics Research, January 2006.
Pathak 2007: Pathak, K., Birk, A., Poppinga, J., and Schwertfeger, S., "3D forward sensor modeling and application to occupancy grid based sensor fusion".

IEEE/RSJ International Conference on Intelligent Robots and Systems, December 2007.

Adarve 2012: Adarve, J. D., Perrollaz, M., Makris, A. and Laugier, C. "Computing Occupancy Grids from Multiple Sensors using Linear Opinion Pools". IEEE International Conference on Robotics and Automation, May 2012.

Fernandez 2015: Fernandez, C. G. D. P., "Grid-based multi-sensor fusion for on-road obstacle detection: application to autonomous driving". Master's Thesis, KTH-CVAP and Volvo Car Corporation, August 2015.

Birk 2006: Birk, A, and Carpin, S.; "Merging occupancy grid maps from multiple robots"; Proceedings of the IEEE, s vol. 94, no 7, pp. 1384-1397, July 2006.

(Andrada Valente da Silva 2019) "SLAM and data fusion for autonomous vehicles: from classical approaches to deep learning methods", *Université Paris Sciences et Lettres*, 18 Mar. 2019.

(Trung-Dung 2009) "Vehicle Perception: Localization, Mapping with Detection, Classification and Tracking of Moving Objects", *Institut National polytechnique de Grenoble*, 18 Sep. 2009.

The invention claimed is:

1. A method for collaboratively detecting tangible bodies in an environment, this method employing a plurality of distance sensors with which respective carriers located in said environment are equipped, at least one of said carriers being mobile, each distance sensor having a position and orientation that are known with a known level of uncertainty, the method comprising the following steps:
   step A) for each distance sensor, acquiring a series of measurements of distance of a closest tangible body along a line of sight; applying, to each said measurement of distance, an inverse model of the distance sensor on a local occupancy grid providing a discretized spatial representation of its field of view, to determine a probability of occupancy by a tangible body of a set of cells of said local occupancy grid; and constructing a consolidated local occupancy grid, each cell of which has an occupancy probability computed via Bayesian fusion of occupancy probabilities thus determined; and
   step B) computing occupancy probabilities of cells of a global occupancy grid via Bayesian fusion of the occupancy probabilities of corresponding cells of at least certain of said consolidated local occupancy grids corresponding to each distance sensor with which separate carriers are equipped.

2. The method according to claim 1, wherein step B) comprises the following substeps, for each cell of the global occupancy grid:
   b1) identifying a subset of cells of each consolidated local occupancy grid meeting a condition of proximity with said cell of the global occupancy grid;
   b2) computing a level of proximity of each cell thus identified with said cell of the global occupancy grid;
   b3) for each local occupancy grid, computing a contribution to the occupancy probability via a weighted mean of the occupancy probabilities of the cells identified in substep b1), weighting coefficients being dependent on corresponding levels of proximity of each cell; and
   b4) carrying out Bayesian fusion of the contributions to the occupancy probabilities computed in substep b3).

3. The method according to claim 2, wherein substep b1) comprises identifying cells of each consolidated local occupancy grid that are located entirely or partially inside a region, of a given radius, centred on the cell of the global probability grid.

4. The method according to claim 3, wherein said radius increases as the level of uncertainty in the position of the distance sensor corresponding to the consolidated local occupancy grid increases.

5. The method according to claim 2, wherein the level of proximity of each cell computed in substep b2) is representative of a density of a probability that the centre of the identified cell coincides with the centre of the cell of the global occupancy grid.

6. The method according to claim 1, wherein step A) is implemented by a plurality of local processing units, each associated with one carrier, and step B) is implemented by a central processing unit, the method also comprising transmitting the consolidated local occupancy grids from said distance sensors to said central processing unit.

7. The method according to claim 1, comprising a prior step of determining a reference position and an orientation defining a reference global coordinate system, wherein step A) comprises, for each sensor, constructing said consolidated local occupancy grid aligned and located in the reference global coordinate system, the occupancy probabilities of said consolidated local occupancy grid being computed taking into account the level of uncertainty in the position and orientation of the sensor.

8. The method according to claim 7, wherein a distance sensor has a position and an orientation that are set and known without uncertainty, these being taken as the reference position and as the orientation of the reference global coordinate system.

9. The method according to claim 7, wherein:
   a central processing unit determines the reference position and the orientation defining the reference global coordinate system and transmits them to a plurality of local processing units, each associated with one carrier;
   step A) is implemented by one of said plurality of local processing units;
   the consolidated local occupancy grids are transmitted by the local processing units to the central processing unit; and
   step B) is implemented by said central processing unit.

10. The method according to claim 1, wherein each said inverse model of the distance sensor is a discrete model, associating, with each cell of a corresponding local occupancy grid, and for each measurement of distance, a probability class chosen from inside a given set of finite cardinality, each said probability class being identified by an integer index; the Bayesian fusion operations being performed by means of integer computations performed on the integer indices of each probability class determined in said step b).

11. A system for collaboratively detecting tangible bodies, comprising:
   a plurality of distance sensors with which respective carriers are equipped, at least one of said carriers being mobile;
   a plurality of locating devices with which at least said one or more mobile carriers are equipped, said locating devices being suitable for determining a position and an orientation of said one or more mobile carriers, and their levels of uncertainty; and
   a processing system configured or programmed to:
      for each distance sensor, acquire a series of measurements of distance of a closest tangible body along a line of sight; apply, to each said measurement of distance, an inverse model of the distance sensor on a local occupancy grid providing a discretized spatial representation of its field of view, to determine a probability of occupancy by a tangible body of a set of cells of said local occupancy grid; construct a consolidated local occupancy grid, each cell of which has an occupancy probability computed via Bayesian fusion of occupancy probabilities thus determined; and compute occupancy probabilities of cells of a global occupancy grid via Bayesian fusion of the occupancy probabilities of corresponding cells of at least certain of said consolidated local occupancy grids corresponding to each distance sensor with which separate carriers are equipped.

12. The system according to claim 11, wherein the processing system comprises a plurality of local processing units each associated with one carrier, a central processing unit and a communication network connecting the central processing unit to each local processing unit, and wherein:

each local processing unit is configured or programmed to construct said consolidated local occupancy grid and to transmit it to the central processing unit; and the central processing unit is configured or programmed to compute the occupancy probabilities of the cells of said global occupancy grid.

13. The system according to claim 12, wherein the central processing unit is configured or programmed to, for each cell of the global occupancy grid:

identify a subset of cells of each consolidated local occupancy grid meeting a condition of proximity with said cell of the global occupancy grid; and compute a level of proximity of each cell thus identified with said cell of the global occupancy grid;

for each local occupancy grid, compute an occupancy probability via a weighted mean of the occupancy probabilities of the identified cells, weighting coefficients being dependent on corresponding levels of proximity of each cell; and carrying out Bayesian fusion of the probabilities thus computed.

14. The system according to claim 12, wherein the central processing unit is configured or programmed to determine a reference position and an orientation defining a reference global coordinate system, and to transmit them to the local processing units; and each local processing unit is configured or programmed to construct said consolidated local occupancy grid aligned and located in the reference global coordinate system, and to compute probability-occupancy values of said consolidated local occupancy grid while taking into account the level of uncertainty in the position and the orientation of the respective distance sensor.

* * * * *